US008344338B2

(12) United States Patent
Lundquist et al.

(10) Patent No.: US 8,344,338 B2
(45) Date of Patent: Jan. 1, 2013

(54) SYSTEMS AND METHODS FOR ENHANCING ELECTRICAL DISCHARGE

(75) Inventors: Paul B. Lundquist, Tucson, AZ (US); Stephen William McCahon, Tucson, AZ (US)

(73) Assignee: Applied Energetics, Inc, Tucson, AZ (US)

( * ) Notice: Subject to any disclaimer, the term of this patent is extended or adjusted under 35 U.S.C. 154(b) by 2304 days.

(21) Appl. No.: 11/126,513

(22) Filed: May 9, 2005

(65) Prior Publication Data

US 2012/0280610 A1    Nov. 8, 2012

(51) Int. Cl.
*G01G 4/00* (2006.01)
(52) U.S. Cl. ...................... 250/493.1; 372/88
(58) Field of Classification Search .............. 372/88; 250/493.1
See application file for complete search history.

(56) References Cited

U.S. PATENT DOCUMENTS

| | | | |
|---|---|---|---|
| 3,404,403 A | 10/1968 | Vallese et al. | 343/700 |
| 3,719,829 A | 3/1973 | Vaill | 307/149 |
| 3,931,589 A * | 1/1976 | Aisenberg et al. | 372/88 |
| 3,947,654 A | 3/1976 | Fairbairn | 219/121.85 |
| 4,017,767 A | 4/1977 | Ball | 361/117 |
| 4,504,964 A | 3/1985 | Cartz et al. | 378/119 |
| 4,668,924 A * | 5/1987 | van de Sande | 331/86 |
| 5,175,664 A | 12/1992 | Diels et al. | 361/213 |
| 5,473,501 A | 12/1995 | Claypool | 361/232 |
| 5,675,103 A | 10/1997 | Herr | 89/1.11 |
| 5,726,855 A | 3/1998 | Mourou et al. | 361/213 |
| 5,930,313 A | 7/1999 | Slinker et al. | 376/127 |
| 5,952,600 A | 9/1999 | Herr | 89/1.11 |
| 6,046,705 A | 4/2000 | Anderson | 343/834 |
| 6,087,992 A | 7/2000 | Anderson | 343/701 |
| 6,087,993 A | 7/2000 | Anderson et al. | 343/701 |
| 6,111,237 A | 8/2000 | Paustian | 219/687 |
| 6,118,407 A | 9/2000 | Anderson | 343/701 |
| 6,169,520 B1 | 1/2001 | Anderson | 343/701 |
| 6,191,386 B1 | 2/2001 | Albright et al. | 219/130.4 |
| 6,355,908 B1 | 3/2002 | Tatah et al. | 219/121.81 |
| 6,359,687 B1 | 3/2002 | Cheng | 356/318 |
| 6,369,763 B1 | 4/2002 | Norris et al. | 343/701 |
| 6,377,436 B1 | 4/2002 | Margolin | 361/230 |

OTHER PUBLICATIONS

B. La Fontaine, et al, "The influence of electron density on the formation of streamers in Electrical Discharges triggered with ultrashort laser pulses," IEEE Transactions on Plasma Science, vol. 27, No. 3, Jun. 1999.
E.M. Bazelyan and Y.P Raizer, "Spark Discharge," 1998 CRC Press LLC, New York (ISBN 0 8493 2868 3).

(Continued)

*Primary Examiner* — Mark Hellner
(74) *Attorney, Agent, or Firm* — Duft Bornsen & Fishman LLP; Gregory T. Fettig

(57) ABSTRACT

Systems and methods presented herein are generally directed to enhancing electrical discharge. A hollow conical electrode may be provided to discharge electrical energy in a directed manner. The conical electrode has two openings: a larger entrance opening; and a smaller exit opening. These openings are configured to allow radiated energy to pass therethrough and form a preferential path of electrical conduction. The larger entrance opening has a surface with a radius of curvature that is larger than that of the second smaller exit opening. The smaller exit opening directs electrical energy to the path because of stronger electric fields. In one embodiment, a protruding electrode element is configured with the smaller exit opening to further enhance electrical discharge by focusing electric fields in the vicinity of the protruding electrode.

21 Claims, 7 Drawing Sheets

OTHER PUBLICATIONS

E.M. Bazelyan and Y.P Raizer, "Lightning Physics and Lightning Protection," Institute of Physics, London 2000 (ISBN 0 7503 0477 4).

D. Koopman et al, "Channeling of an ionizing electrical streamer by a laser beam," Journal of applied physics, vol. 42, No. 5, Apr. 1971.

T. Shindo et al, "Model Experiments of Laser-Triggered Lightning," IEEE Transactions on Power Delivery, vol. 8, No. 1, p. 311, Jan. 1993.

Megumu Miki, Yoshinori Aihara and Takatoshi Shindo, "Development of long gap discharges guided by a pulsed CO2 laser," J. Phys. D: Appl. Phys. 26, pp. 1244-1252, (1993).

A. Bondiou et al, "Theoretical modeling of the development of the positive spark in long gaps," J. Phys. D: Appl. Phys. 27 (1994) 1252-1266.

A. Braun et al, "Self-channeling of high-peak-power femtosecond laser pulses in air," Optics Letters, vol. 20, No. 1, Jan. 1, 1995.

Zhao et al, "Femtosecond Ultraviolet Laser Pulse Induced Lightning Discharges in Gases," IEEE Journal of Quantum Electronics, vol. 31, No. 3, Mar. 1995.

H. Schillinger, et al.,"Electrical conductivity of long plasma channels in air generated by self-guiding femtosecond laser pulses," Appl. Phys. B 68, 753-756 (1999).

La Fontaine, F. Vidal, Z. Jiang, C.Y. Chien, D. Comtois, A. Desparois, T.W. Johnson, J.-C. Kieffer, H. Pepin, "Filamentation of ultrashort pulse laser beams resulting from their propagation over long distances in air," Physics of Plasmas 6(5), pp. 1615-1621, (May 1999).

E.M. Bazelyan and Y.P Raizer, "The mechanism of lightning attraction and the problem of lightning initiation by lasers," Physics-Uspekhi 43 (7) 701-716 (2000).

S. Tzortzakis, "Femtosecond laser-guided electrical discharge in air," Physical Review E, vol. 64, 057401.

J. Schwarz et al, "Measurement of multiphoton coefficients with ultrashort ultraviolet laser pulses," Applied Physics B 72, pp. 343-347 (2001).

H.D. Ladouceur, "Electrical conductivity of a femtosecond laser generated plasma channel in air," Optics Communications 189 (2001) pp. 107-111, Mar. 1, 2001.

D. Comtois, et al ,"Triggering and guiding of an upward positive leader from a ground rod with an ultrashort laser pulse—I: Experimental Results," IEEE Transactions on Plasma Science 2003 vol. 31(3) p. 377-386.

D. Comtois, et al, "Triggering and guiding of an upward positive leader from a ground rod with an ultrashort laser pulse—II: Modeling," IEEE Transactions on Plasma Science 2003 vol. 31(3) p. 387-395.

F. Vidal, et al, "Modeling the triggering of Streamers in Air by Ultrashort Laser Pulses," IEEE Transactions on Plasma Science, vol. 28, No. 2, Apr. 2000.

H.P Mercure, et al, "Guiding and Triggering Large-Scale Spark Discharges Using Ultrashort Pulse Lasers," 25th International Conference on Lightning Protection, Rhodes-Greece, Sep. 18-22, 2000, p. 48.

F. Vidal, "The control of lightning using lasers: properties of streamers and leaders in the presence of laser-produced ionization," C.R. Physique 3 (2002) pp. 1361-1374.

H. Pepin, et al, "Triggering and guiding high-voltage large-scale leader discharges with ultrashort laser pulses," Physics of Plasmas 2001 vol. 8 p. 2532-2539.

Rambo, et al, "High-voltage electrical discharges induced by an ultrashort-pulse UV laser system," J. Opt. A, 3 (2001), pp. 146-158.

M. Rodriguez et al, "Triggering and Guiding megavolt discharges by use of laser-induced ionized filaments," Optics Letters, vol. 27, No. 9, May 1, 2002.

D.F. Gordon, "Streamerless guided electrical discharges triggered by femtosecond laser filaments," Physics of plasmas, vol. 10, No. 11, 2003.

Joseph Penano, "Ultrashort Laser Pulse Propagation and Induced Discharges", NTAR Symposium Nov. 15-17, 2004, NRL—(Power point presentation found on Internet but later removed).

Mathew A. Kozma, "A Brief History of Laser Guided Lightning Discharge Models and Experiments," Phillips laboratory technical report PL-TR-94-2193, Environmental Research Papers, No. 1153.

* cited by examiner

SYSTEMS AND METHODS FOR ENHANCING ELECTRICAL DISCHARGE

BACKGROUND OF THE INVENTION

1. Field of the Invention

The invention generally relates to enhancing electrical discharge. More specifically, the invention relates to selecting electrode geometries such that electric discharges from the electrode in a desired manner.

2. Discussion of the Related Art

An electrode is an electrically conductive device that is often used to deliver or receive electricity. One example of an electrode is a rounded metallic electrode configured with a Tesla coil. Such a rounded electrode is typically charged with electrical energy by the Tesla coil. The rounded electrode may maintain the electrical energy until there is an electrical breakdown in the gas surrounding the electrode. For example, when the electric potential between the rounded electrode and another point of conduction is high enough, the gas between the electrode and the point of conduction dielectrically breaks down and electric current conducts from the electrode to the other point of conduction. Dielectric breakdown of gas is well known to those skilled in the art.

Typically, the rounded electrode of a Tesla coil discharges electrical energy in a substantially random manner. For example, the electrical charge maintained by a rounded electrode may be fairly uniform. Uniform electrical charge densities have uniform electric fields, or "E fields", with no tendency to discharge in any particular direction. Accordingly, the electrical discharge may be substantially uncontrollable, or random.

SUMMARY OF THE INVENTION

In one embodiment of the invention, the electrode includes: a conductive surface; and one or more protrusions extending from the conductive surface to discharge electrical energy from the conductive surface, wherein the electrode is hollow and is configured for passing a beam of laser pulses therethrough. The conductive surface may be configured for maintaining electrical energy. For example, the conductive surface may be coupled to a secondary coil of a Tesla coil for receiving electrical energy therefrom.

The electrode may have a conical shape and a first opening and wherein the one or more protrusions extend from the first opening. At least one of the one or more protrusions includes a load element a comprises capacitance, inductance, resistance, and combinations thereof. Additionally, the electrode may have a second opening for passing the beam of laser pulses therethrough, wherein the second opening is wider than the first opening to deter electrical discharge from the second opening. The beam of laser pulses may be configured for forming a path for conduction proximate to the one more protrusions such that the one or more protrusions discharge the electrical energy to the path. An interior of the electrode may be shaped to deter electrical discharge within the interior.

In another embodiment of the invention, a conical electrode includes: a conductive surface; a first opening of the conical electrode; and a second opening of the conical electrode, wherein the first opening is larger than the second opening and wherein a surface of the first opening has a larger radius of curvature than a surface of the second opening. The first opening and the second opening may provide for a path for electrical conduction through the electrode. For example, the path for electrical conduction may be configured by a beam of laser pulses passing through the first and second openings.

In another embodiment of the invention, a method for directing electrical energy includes: providing a focal point for an electric field to emanate from a conductive surface; charging the conductive surface with electrical energy; and providing a conductive region spaced apart from the conductive surface and proximate to the focal point to allow the electrical energy to discharge thereto. Providing the conductive region may include configuring a laser to fire laser pulses proximate to the focal point. For example, laser may be configured to fire temporally adjusted laser pulses. Providing a focal point for an electric field may include providing a first aperture and a second aperture defined in the conductive surface, wherein the first aperture is larger than the second aperture and wherein the first aperture has a larger radius of curvature than the second aperture. Alternatively, or in addition to, providing a focal point for an electric field may include providing a first opening and a second opening, wherein the first opening has a first curved surface, the second opening has a second curved surface. Additionally, providing a focal point for the electric field may include providing one or more protrusions on the conductive surface from which the electric field emanates.

In one embodiment of the invention, the electrode includes: an electrode body, the body having a first opening and a second opening formed on an outer surface thereof, wherein the first opening is larger than the second opening and wherein a curved surface in the vicinity of the first opening has a larger radius of curvature than a curved surface in the vicinity of the second opening.

BRIEF DESCRIPTION OF THE DRAWINGS

FIG. 8 illustrates a front view of the electrode of FIG. 6. The and

DETAILED DESCRIPTION OF THE DRAWINGS

Figure 1:
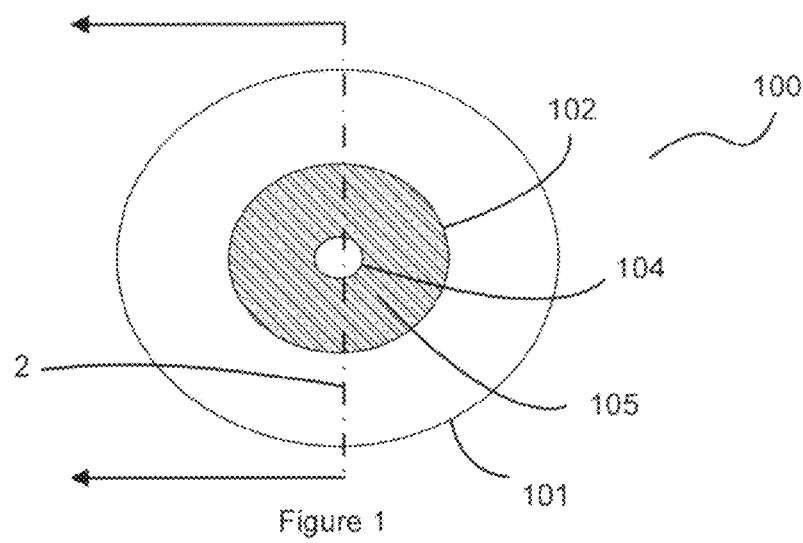
FIG. 1 illustrates a rear view of a conical electrode, in one exemplary embodiment of the invention.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 2:
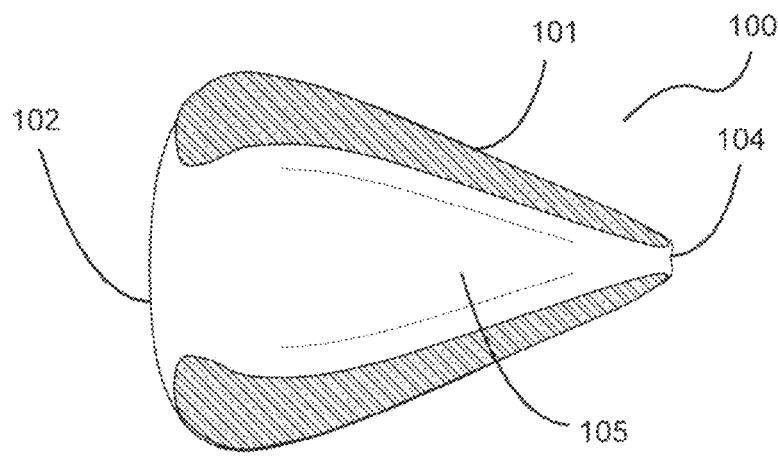
FIG. 2 illustrates a cross-sectional view along line 2 of the conical electrode of FIG. 1.
Figure 3:
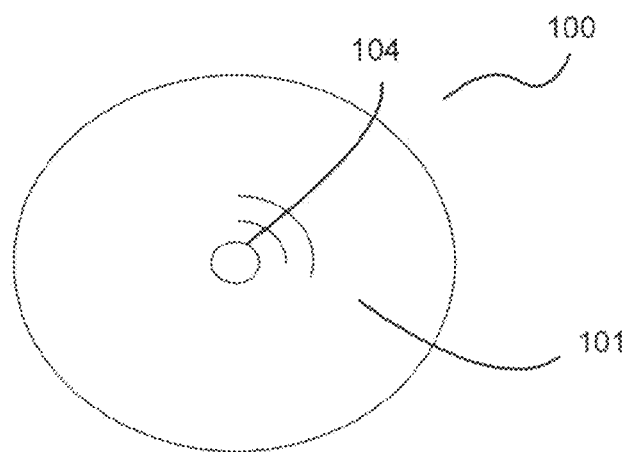
FIG. 3 illustrates a front view of the conical electrode of FIG. 1.

FIGS. 1-3 illustrate conical electrode 100, in one exemplary embodiment of the invention. Conical electrode 100 is configured for discharging electrical energy. When conical electrode 100 is charged with electrical energy, the electrode maintains an electric charge with the surfaces of conical electrode 100 until the electrode discharges.

In this embodiment, conical electrode 100 has hollow interior 105 and includes conductive surface 101 to maintain an electrical charge thereon. Conical electrode 100 has first opening 102 (e.g., an entrance) and second opening 104 (e.g., an exit), wherein first opening 102 is configured to be larger than second opening 104. Additionally, conical electrode 100 is shaped in such a way that the electrical charge thereon may be discharged in a directed manner. For example, when the electric potential (i.e., voltage) between two conductive surfaces is high enough, a gas (e.g., air) may break down and electric current may flow between the two conductive surfaces in the form of electrical discharge from one conductive surface to the other. The electrical conduction between conical electrode 100 and another conductor is enhanced through the conical shape of conical electrode 100 as well as the radii of curvature for first opening 102 and second opening 104.

The other conductor that may be used to conduct electrical energy from conical electrode 100 may be configured from a beam of laser pulses fired through conical electrode 100. For example, first opening 102 and second opening 104 may allow a beam of laser pulses to pass therethrough. The laser pulses may be configured in such a way as to form a preferential path for electrical conduction proximate to second opening 104 such that the electrical energy maintained by conical electrode 100 may be conducted thereto. Examples of such laser pulses and preferential paths of electrical conduction are shown and described in the co-pending and commonly owned U.S. patent application Ser. No. 11/126,519 entitled "Systems and Methods for Transferring Electrical Energy" filed May 9, 2005, the entire contents of which are hereby incorporated by reference.

With typical rounded electrodes, electrical discharge may occur at points of the electrode that are unpredictable and/or undesirable. By making first opening 102 larger than second opening 104, the distance between conductive surface 101 and the path for electrical conduction is smaller and may, therefore, be more likely to discharge in the vicinity of second opening 104. For example, dielectric breakdown of a gas, such as air, typically corresponds to a relationship of electric potential and distance. As distance between two conductors decreases, the electric potential required to cause dielectric breakdown of the gas also decreases. By configuring first opening 102 to be larger than second opening 104, electrical discharge accordingly may not occur in the vicinity of first opening 102 when a laser pulse, e.g., fired therethrough generates a preferential path for electrical conduction.

As an additional deterrent to electrical discharge about first opening 102, the surface in the vicinity of first opening 102 may have a radius of curvature that is substantially larger than a radius of curvature of second opening 104. For example, electric fields tend to focus about "less continuous" shapes, such as protrusions. By making the radius of curvature of first opening 102 substantially larger than that of second opening 104, electric fields from the electrical energy stored on conductive surface 101 may be larger in the vicinity of second opening 104. Accordingly, as a preferential path for electrical conduction is generated in the vicinity of conical electrode 100, electrical energy maintained therewith may be discharged to the path in the vicinity of second opening 104 as opposed to first opening 102. Such a discharge is desirable because, among other reasons, the discharge is more predictable and controllable. Further, second opening 104 may be oriented in the direction of an ultimate desired target for the electrical energy.

Those skilled in the art should readily recognize that the invention is not intended to be limited to electrical discharge via a laser induced preferential path for electrical conduction. For example, the electric potential between the electrode and another point of conduction alone may be sufficient to cause electrical discharge from the electrode at second opening 104 to the other point conduction. Moreover, other forms of energy may be directed through or about electrode 100 so as to create a conductive path between second opening 104 such that the electrical energy discharges to the conductive path.

Figure 4:
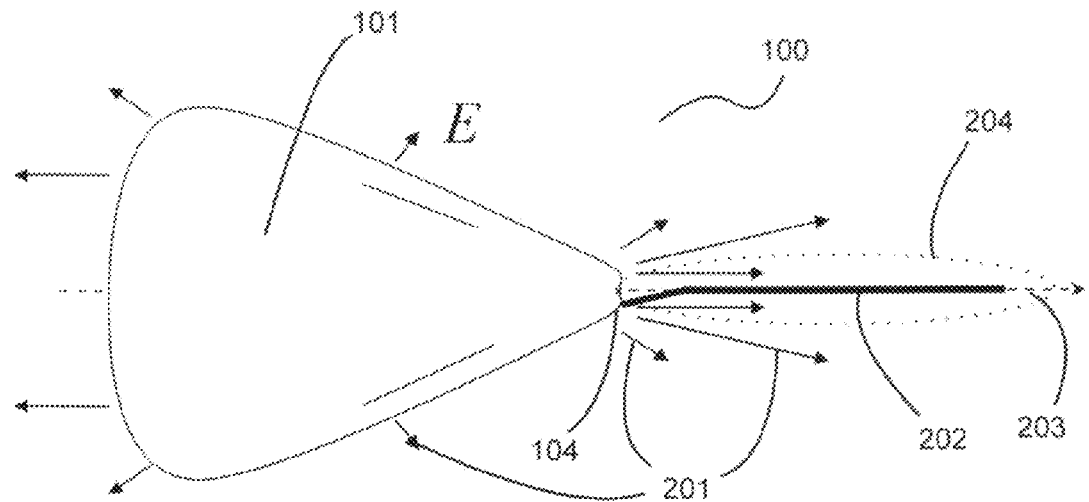
FIG. 4 illustrates a side view of the conical electrode of FIG. 1 providing electrical discharge, in one exemplary embodiment of the invention.
Figure 5:
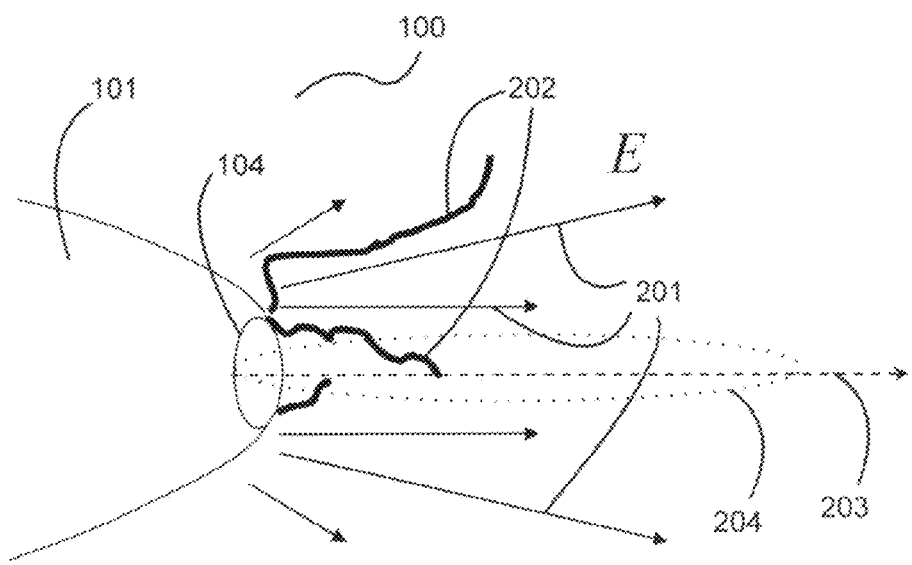
FIG. 5 illustrates a magnified side view of the conical electrode of FIG. 1 also providing electrical discharge, in one exemplary embodiment of the invention.

FIGS. 4 and 5 illustrate electrical discharge with conical electrode 100, in one exemplary embodiment of the invention. Electric field lines 201 form with respect to conical electrode 100 when an electrical charge is stored upon conductive surface 101. Electric field lines 201 tend to concentrate, or focus, about second opening 104 because, among other reasons, the radius of curvature for second opening 104 is substantially smaller than that of first opening 102. Accordingly, the electric field in the vicinity of second opening 104 is stronger than the electric field in the vicinity of first opening 102. As illustrated in FIG. 4, a beam of laser pulses 203 may propagate through conical electrode 100 (i.e., via first opening 102, hollow interior 105, and second opening 104) and create a preferential path for electrical conduction 204 in the vicinity of conical electrode 100. Electrical energy 202 may thereby desirably discharge to path 204 (e.g., via dielectric break down and/or direct conduction) in the vicinity of second opening 104.

Path 204, in essence, transfers the electrical energy 202 from conical electrode 100 to a point distal to the electrode (e.g., a target of interest, such as a human, a nonhuman animal, a ground vehicle, an air vehicle, electronic system, etc.). For example, as a laser pulse 203 propagates through conical electrode 100, the laser pulse may optically filament the gas surrounding electrode 100 (i.e., within the laser beam's cross-section). This optical filamenting may generate a seeded channel segment to which electrical energy may be preferentially conducted. Electric fields 201 focused towards the seeded channel segment may enhance the conductivity of the segment and the electrical energy of the electrode 100 may be discharged thereto.

FIG. 5 illustrates electrical energy 202 being conducted from conical electrode 100 in the vicinity of second opening 104. For example, electric field lines 201 tend to focus near second opening 104 to create a stronger electric field. As beam of laser pulses 203 propagates through electrode 100 via second opening 104 and path 204 forms, electrode 100 may discharge upon obtaining a particular voltage. The electrical discharge may therefore be controllably directed along path 204.

Strength of the electric field caused by the smaller second opening 104 may assist in discharging conical electrode 100. For example, electrical discharge may occur between two conductors having different electric potentials due to the attractive forces between positive and negative charges. The strength of the electric field represents the attraction between the positive and negative charges of the conductors. Accordingly, when the electric potential difference between conical electrode 100 and path 204 is high enough, the strength of the electric field may cause a dielectric breakdown of air and/or direct conduction to path 204.

As illustrated in this embodiment, most of the electrical energy 202 is discharged to path 204. However, some electrical energy 202 may unpredictably discharge, or "arc", in unintended directions. Additional features, may be provided to conical electrode 100 to further enhance electrical discharge to path 204. Examples of such embodiments are illustrated below in FIGS. 6 through 12.

Figure 6:
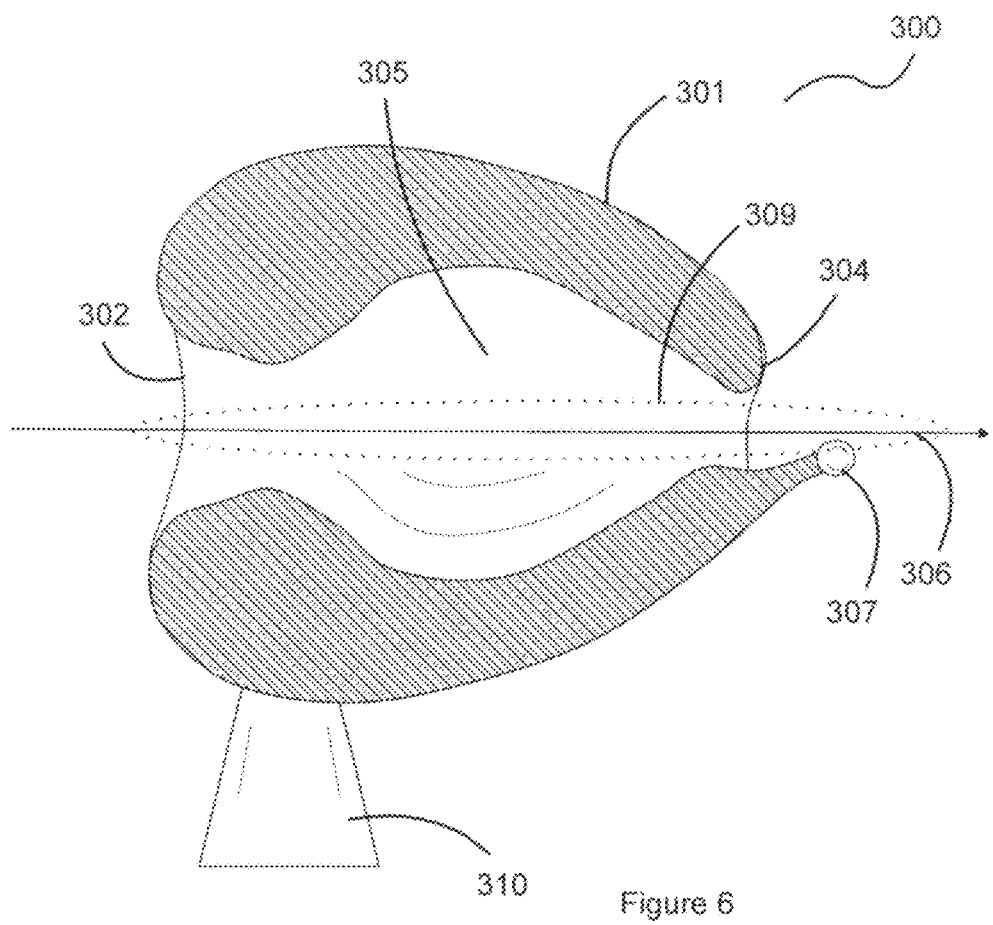
FIG. 6 illustrates a cross-sectional view of the electrode having a conical shape and a protruding electrode element, in one exemplary embodiment of the invention.
Figure 7:
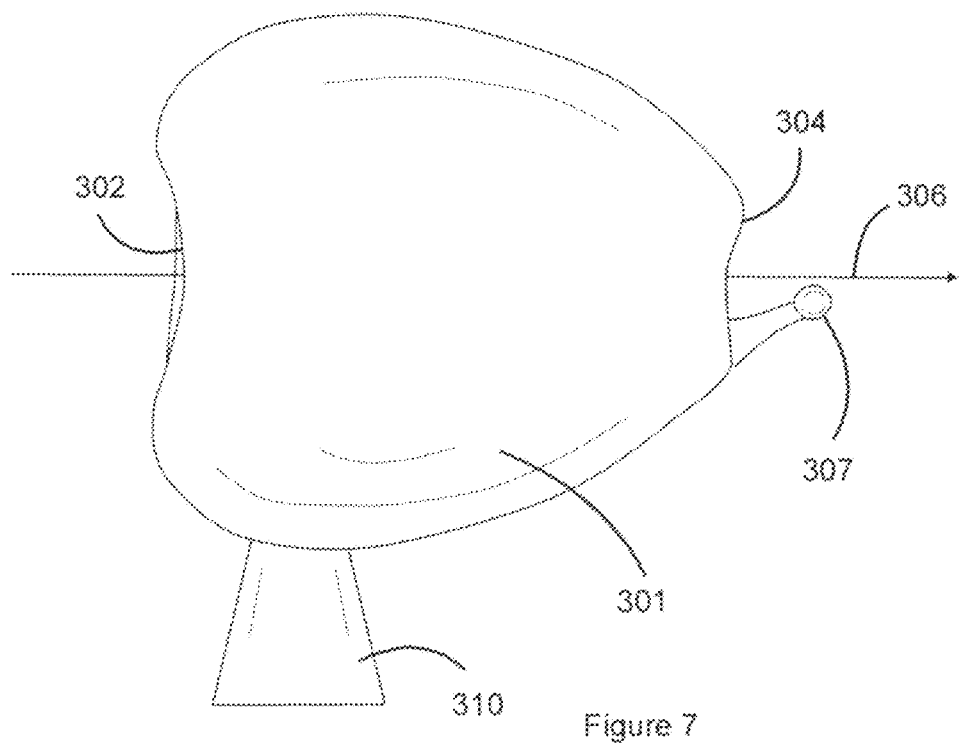
FIG. 7 illustrates a side view of the electrode of FIG. 6.

FIGS. 6-9 illustrate electrode 300 with protruding element 307, in one exemplary embodiment of the invention. FIG. 7 illustrates a side view of electrode 300 as a beam of laser pulses 306 would pass therethrough. FIG. 6 illustrates a cross-sectional view of FIG. 7. In this regard, electrode 300 has a conical shape with rounded edges and a conductive surface 301 to maintain electrical charge thereon. For example, electrode 300 may be coupled to a power source, such as a Tesla coil and a high-voltage power supply, via coupling 310 to receive electric current and store an electrical charge therefrom. Like conical electrode 100 described hereinabove, electrode 300 has first opening 302, hollow interior 305, and second opening 304 for propagating a beam of laser pulses 306 therethrough. In this embodiment, the annular entrance that forms first opening 302 has a relatively larger radius of curvature compared to first opening 102 of FIG. 1. Second opening 304, while having a radius of curvature that is substantially smaller than that of first opening 302, also has a radius of curvature that is relatively larger to that of second opening 104 of FIG. 1.

These larger radii of curvature enhance electrical discharge at a desired location by creating stronger but more uniform electric fields in the vicinity of second opening 304 alone. A protrusion (i.e., protruding electrode element 307) may be configured upon electrode 300 to further enhance electrical discharge in a desired manner. For example, protruding electrode element 307 may focus electric field lines in the nearby vicinity more intensely than second opening 304. The more focused electric field lines tend to form a stronger electric field. Accordingly, when a beam of laser pulses 306 propagates through electrode 300 and creates a preferential path 309 for conduction proximate to protruding electrode element 307, a dielectric breakdown may occur and electrical energy may be discharged more directly along the path from protruding electrode element 307.

Figure 8:
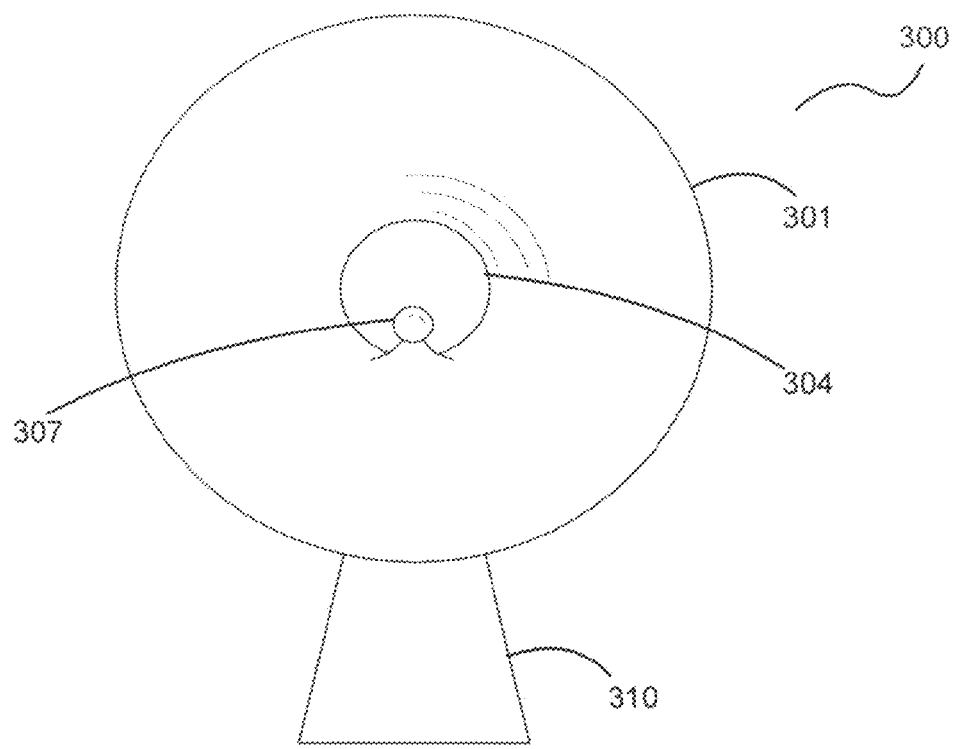
Figure 9:
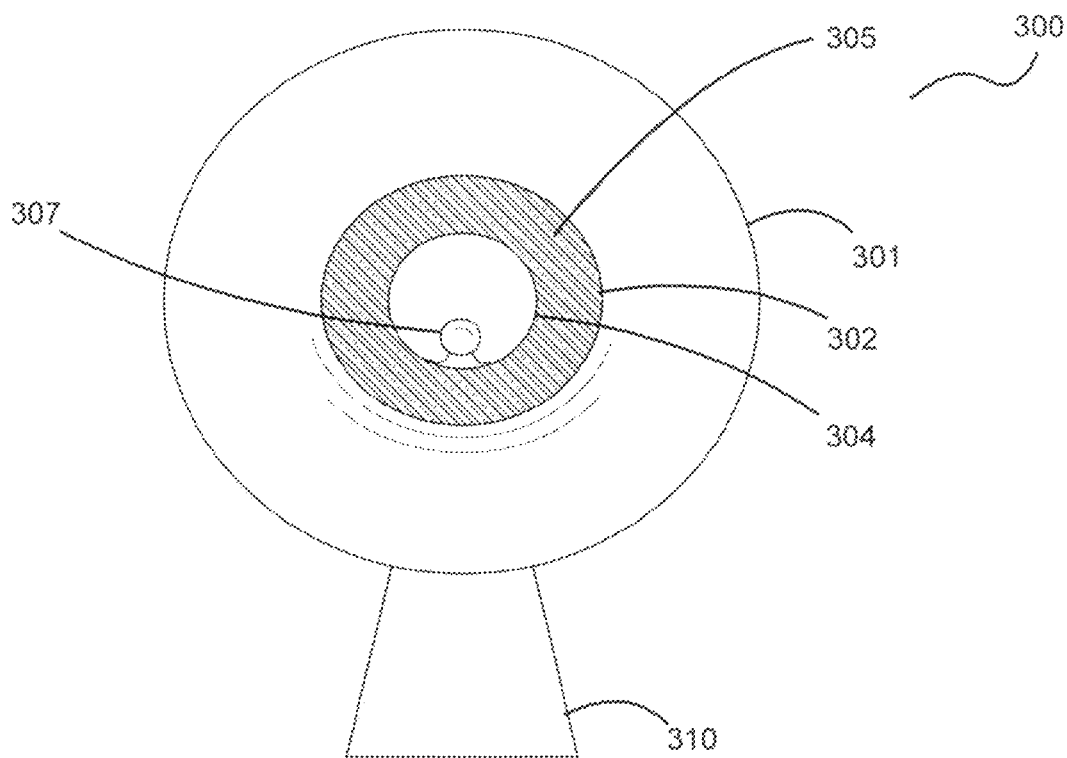
FIG. 9 illustrates a rear view of the electrode of FIG. 6.

FIGS. 8 and 9 respectively illustrate laser pulse exit and entrance views of electrode 300. For example, FIG. 8 illustrates a view of second opening 304 with protruding electrode element 307 extending into the aperture of the second opening. FIG. 9, on the other hand, illustrates a view of first opening 302. Particularly visible from FIG. 9 is the larger aperture of first opening 302. The larger aperture of first opening 302, coupled with the larger radius of curvature, deters electrical discharge from occurring in the vicinity of first opening 302. Also visible in FIG. 9 is protruding electrode element 307 as it extends into the aperture of second opening 304.

Figure 10:
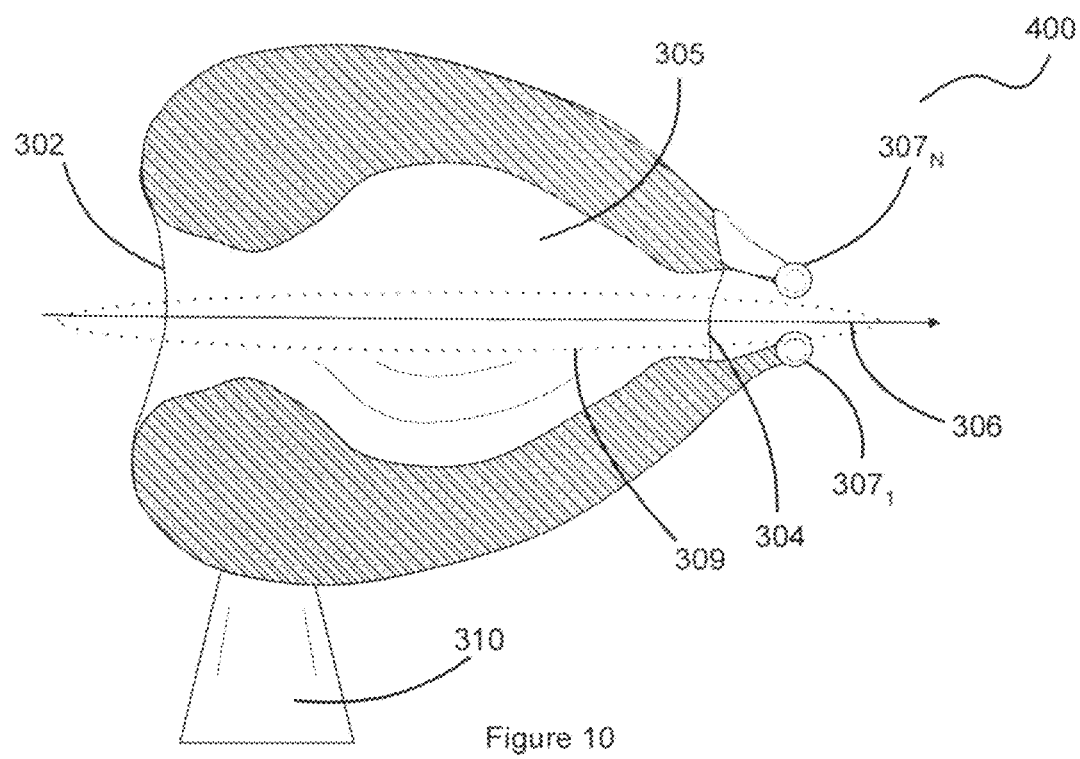
FIG. 10 illustrates cross-sectional view of an electrode with a plurality of protruding electrode elements, in one exemplary embodiment of the invention.
Figure 11:
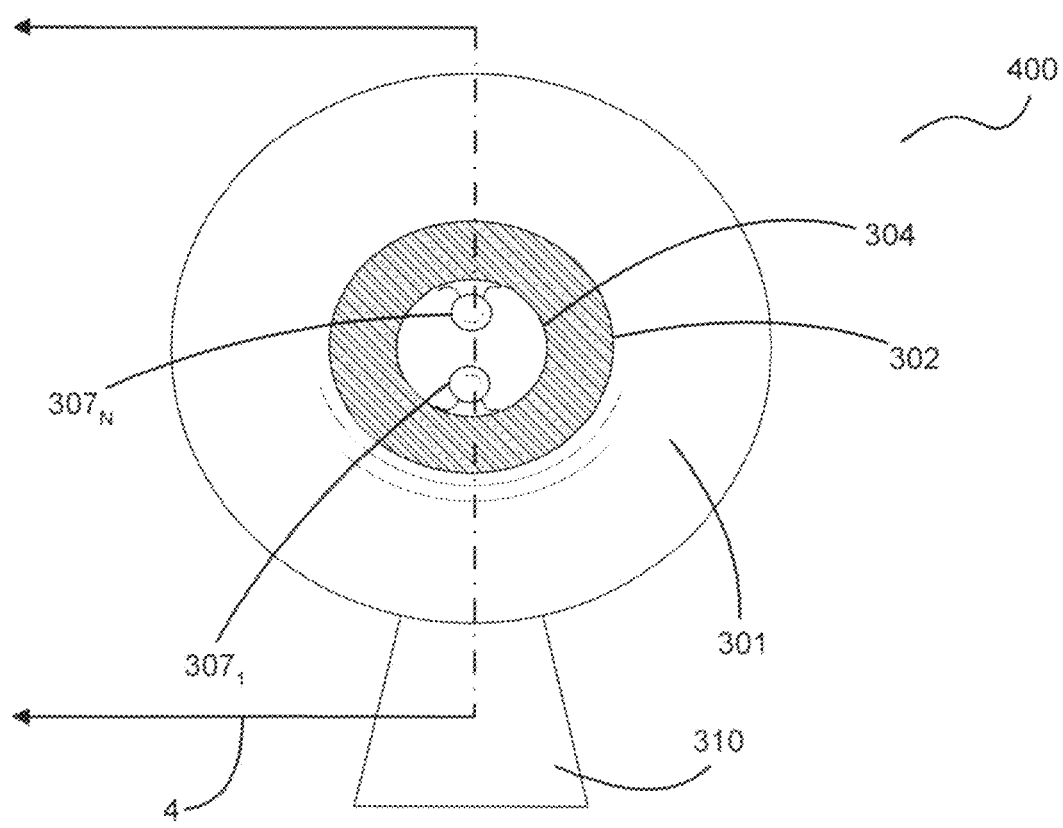
FIG. 11 illustrates a rear view of the electrode of FIG. 10.

FIGS. 10 and 11 illustrate electrode 400 with a plurality of protruding electrode elements $307_1 \ldots _N$, in one exemplary embodiment of the invention. More particularly, FIG. 10 illustrates a cross-sectional view of electrode 400 (e.g., similar to the view in FIG. 6) along line 4 and FIG. 11 illustrates an entrance view (e.g., similar to the view in FIG. 9). In this embodiment, two protruding electrode elements $307_1$ and $307_N$ are illustrated as being configured with electrode 400 to control electrical discharge. For example, two protruding electrode elements $307_1$ and $307_N$ are configured approximately 180 degrees apart from one another on the circular aperture of second opening 304. The two protruding electrode elements $307_1$ and $307_N$ may focus electric field lines at two points and further enhance electrical discharge to path 309 as formed, for example, by laser beam 306.

Because electrical discharge is a somewhat random process, a protruding electrode element 307 tends to focus electric field lines upon conductive surface 301 and thereby create a stronger electric field near protruding electrode element 307. However, electrical discharge may still randomly occur at portions of electrode 400 that are undesirable. Two protruding electrode elements 307 may focus those electric field lines about "hemispheres" of conductive surface 301. This hemisphere like division of the electric field lines may form a sort of division of the electric field emanating from conductive surface 301. Accordingly, the electric field may be substantially weaker at portions of electrode 400 where electrical discharge is undesirable, such as at first opening 302. Such division of the electric field may therefore provide a more controlled discharge at second opening 304 and, more particularly, at protruding electrode elements 307.

Those skilled in the art should readily recognize that electrode 400 is not intended to be limited to two protruding electrode elements $307_1$ and $307_N$. Rather, protruding electrode element $307_N$ may be one of a plurality of protruding electrode elements. Accordingly, the subscript N may be an integer greater than one that designates the number of protruding electrode elements 307 configured with electrode 400.

Figure 12:
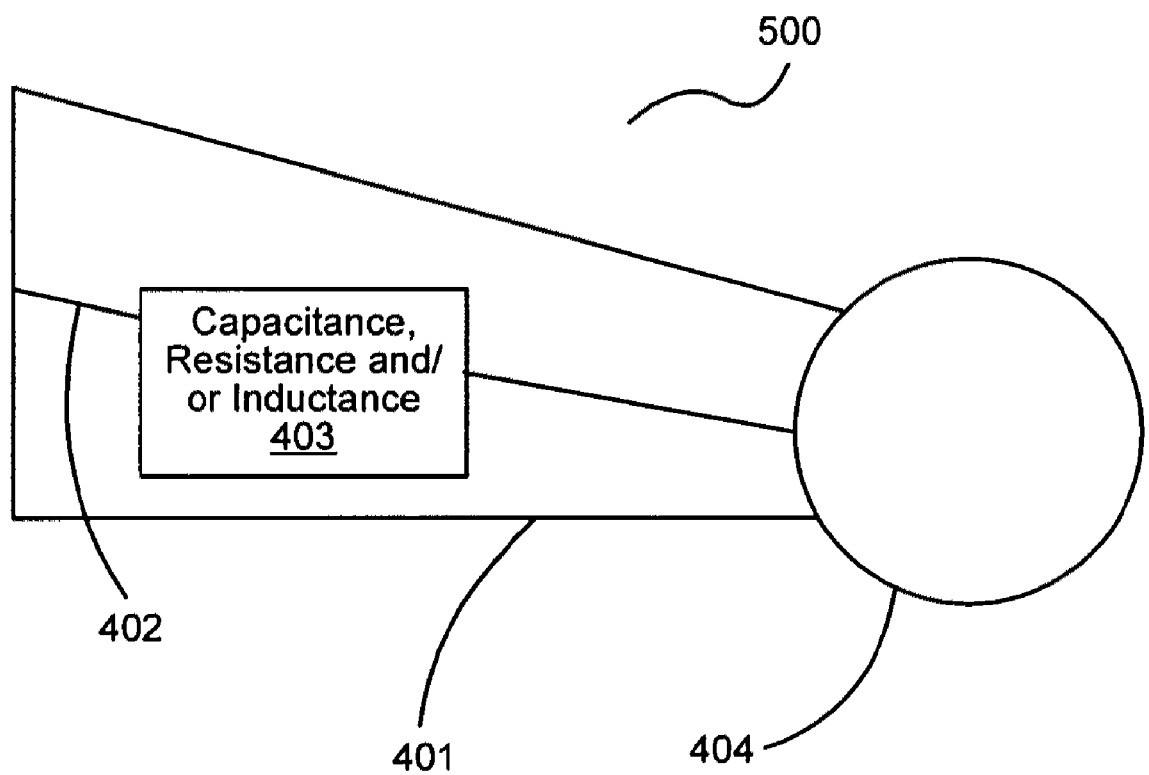
FIG. 12 is an illustration of a protruding electrode element, in one exemplary embodiment of the invention.

FIG. 12 is an illustration of protruding electrode element 500, such as protruding electrode elements $307_1$ and $307_N$, in one exemplary embodiment of the invention. Protruding electrode element 500 comprises rounded tip 404 connected to extension element 401. Extension element 401, in turn, connects to an electrode in the vicinity of the smaller of the two openings, such as those of electrodes 300 and 400 described and shown hereinabove. Extension element 401 may be formed of a conductive material or a dielectric material. Electrical discharge from the electrode may, in fact, be enhanced by the material used to construct extension element 401. For example, in the embodiment of electrode 400, one protruding electrode element 307 may have an extension element 401 formed of a dielectric material while the other protruding electrode element 307 may have an extension element 401 formed of a conductive material. The two types of extension elements 401 may alter the electric field lines emanating from the conductive surface of the electrode. Accordingly, alternative embodiments may control electrical discharge from the electrode based on the number of protruding electrode elements 307 and/or the different types of extension elements 401.

Additionally, protruding electrode element 307 may be configured with a conductor 402 that conducts from the conductive surface of an electrode. For example, conductor 402 may be a conductive wire (e.g., aluminum, copper, or other conductive material) that couples between rounded tip 404 and the electrode. Additionally, protruding electric element 307 may include load element 403 comprising capacitive, resistive, and/or inductive components, to draw current through conductor 402 to rounded tip 404. The capacitive, resistive, and/or conductive component values of load element 403 may be design choices based on desired current flow through conductor 402.

Figure 13:
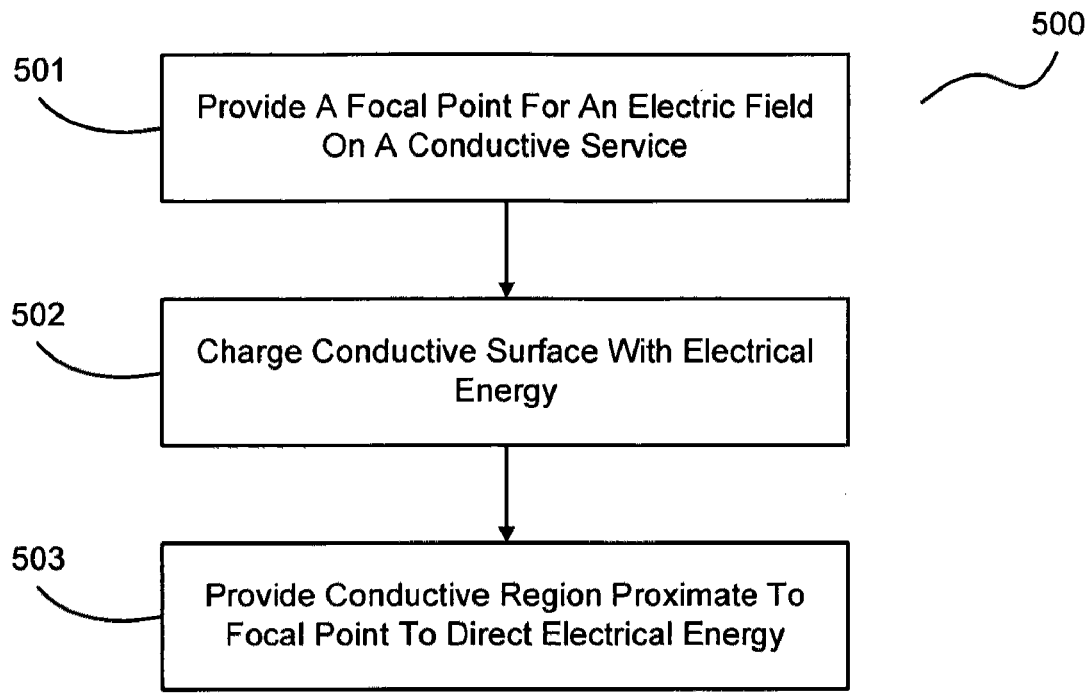
FIG. 13 illustrates a flowchart in one exemplary methodical embodiment of the invention.

FIG. 13 illustrates flowchart 500 in one exemplary methodical embodiment of the invention. In this embodiment, a focal point for electric field is provided on a conductive surface, in process element 501. For example, a focal point may be configured upon a conical electrode, such as conical electrodes 100, 300, and 400 described hereinabove, having a conductive surface. The focal point may be an aperture of the conical electrode having a smaller opening and smaller radius of curvature than another aperture of the conical electrode. Additionally, the conductive surface may be configured with one or more protrusions (e.g., protruding element 307). These one or more protrusions may focus electric field lines in the vicinity of the conductive surface such that the electric field at the protrusions is stronger. Further, the focal point could be provided in any other suitable manner.

The conductive surface is charged with electrical energy, in process element 502. For example, the conductive surface may be charged with electrode energy by means of a Tesla coil. Once charged, the electric field may be stronger near the focal point of the electrode. A conductive region is provided proximate to the focal point to direct the electrical energy thereto, in process element 503. For example, FIG. 14 illustrates process element 503 used in the methodical embodiment of FIG. 13 in which a laser is configured to fire laser pulses proximate to the focal point (i.e., process element 504).

Figure 14:
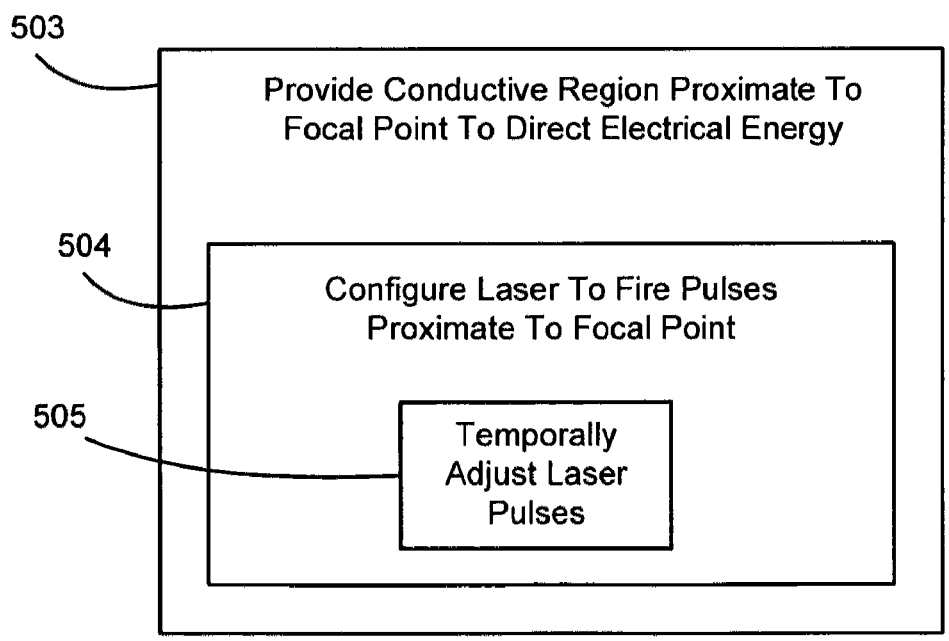
FIG. 14 illustrates a process element used in the methodical embodiment of FIG. 13.

Illustrated in FIG. 14, the laser pulses may be temporally adjusted, in process element 505. Such temporal adjustment may be performed by a Chirped Pulse Amplifier ("CPA") laser. The laser pulses may optically filament air in the vicinity of the focal point along the path of the laser beam. The optical filaments may thereby provide a preferential path for electrical conduction. For example, the stronger (e.g., focused) electric fields at the focal point may cause a preferential path to become conductive. As such, the electrical energy of the electrode may controllably discharge along the preferential path.

While the invention has been illustrated and described in detail in the drawings and foregoing description, such illustration and description is to be considered as exemplary and not restrictive in character. Accordingly, it should be understood that only the preferred embodiment and minor variants thereof have been shown and described and that all changes and modifications that come within the spirit of the invention are desired to be protected.

The invention claimed is:

1. An electrode, comprising:
a conductive surface; and
one or more protrusions extending from the conductive surface to discharge electrical energy from the conductive surface, wherein the electrode is hollow and is configured for passing a beam of laser pulses therethrough.

2. The electrode of claim 1, wherein the electrode comprises a conical shape and a first opening and wherein said one or more protrusions extend from the first opening.

3. The electrode of claim 1, wherein the electrode comprises a second opening for passing the beam of laser pulses therethrough and wherein the second opening is wider than the first opening to deter electrical discharge from the second opening.

4. The electrode of claim 1, wherein the beam of laser pulses is configured for forming a path for conduction proximate to the one or more protrusions such that the one or more protrusions discharge the electrical energy to the path.

5. The electrode of claim 1, wherein the conductive surface is configured for maintaining electrical energy.

6. The electrode of claim 5, wherein the conductive surface is coupled to a secondary coil of a Tesla coil.

7. The electrode of claim 1, wherein an interior of the electrode is shaped to deter electrical discharge within the interior.

8. The electrode of claim 1, wherein at least one of said one or more protrusions comprises a load element selected from a group consisting of capacitance; inductance; resistance; and combinations thereof.

9. A conical electrode, comprising:
a conductive surface;
a first opening of the conical electrode; and
a second opening of the conical electrode, wherein the first opening is larger than the second opening and wherein a surface of the first opening has a larger radius of curvature than a surface of the second opening, wherein the first opening and the second opening provide a path for electrical conduction through the electrode and wherein the path for electrical conduction is configured by a beam of laser pulses passing through the first and second openings.

10. The conical electrode of claim 9, further comprising one or more protrusions extending from the second opening.

11. The conical electrode of claim 10, wherein the path of said one or more protrusions comprises a load element selected from a group consisting of: capacitance; inductance; resistance; and combinations thereof.

12. A method for directing electrical energy, comprising:
providing a focal point for an electric field to emanate from a conductive surface;
charging the conductive surface with electrical energy; and
providing a conductive region spaced apart from the conductive surface and proximate to the focal point to allow the electrical energy to discharge thereto,
wherein providing a conductive region includes configuring a laser to fire laser pulses proximate to the focal point.

13. The method of claim 12, wherein configuring a laser includes temporally adjusting the laser pulses.

14. The method of claim 12, wherein providing a focal point for an electric field includes providing a first aperture and a second aperture defined in the conductive surface, wherein the first aperture is larger than the second aperture and wherein the first aperture has a larger radius of curvature than the second aperture.

15. The method of claim 12, wherein providing a focal point for an electric field includes providing one or more protrusions on the conductive surface.

16. The method of claim 12, wherein providing a focal point for an electric field includes providing a first opening and a second opening, wherein the first opening has a first curved surface, the second opening has a second curved surface, and the first curved surface has a larger radius of curvature than the second curved surface.

17. The method of claim 15, wherein the focal point for an electric field to emanate includes one or more protrusions from which the electric field emanates.

18. The method of claim 17, wherein at least one of said one or more protrusions comprises a load element selected from a group consisting of capacitance; inductance; resistance; and combinations thereof.

19. An electrode, comprising:
An electrode body, the body having a first opening and a second opening formed on an outer surface thereof, wherein the first opening is larger than the second opening and wherein a curved surface in the vicinity of the second opening has a larger radius of curvature than a curved surface in the vicinity of the second opening, wherein the first opening and the second opening provide for a path for electrical conduction through the electrode and wherein the path for electrical conduction through the electrode is configured by a beam of laser pulses passing through the first and second openings.

20. The electrode of claim 19, further comprising one or more protrusions extending from the second opening.

21. The electrode of claim 20, wherein at least one of said one or more protrusions comprises a load element selected from a group consisting of: capacitance; inductance; resistance; and combinations thereof.

* * * * *